United States Patent [19]
Riera

[11] Patent Number: 5,152,573
[45] Date of Patent: Oct. 6, 1992

[54] EXTENSIBLE SUN VISOR FOR MOTOR VEHICLE

[75] Inventor: Ramón T. Riera, Barcelona, Spain

[73] Assignee: Antonio Tosquella Babiloni, Tarrega, Spain

[21] Appl. No.: 707,068

[22] Filed: May 29, 1991

[30] Foreign Application Priority Data

Jun. 1, 1990 [ES] Spain ................................. 9001514

[51] Int. Cl.⁵ .............................................. B60J 3/02
[52] U.S. Cl. .................................. 296/97.4; 296/97.5; 296/97.8
[58] Field of Search .................... 296/97.8, 97.6, 97.4, 296/97.5

[56] References Cited

U.S. PATENT DOCUMENTS

| | | | |
|---|---|---|---|
| 2,134,414 | 10/1938 | Norcross | 296/97.8 |
| 2,228,209 | 1/1941 | Harrington | 296/97.8 |
| 2,603,530 | 7/1952 | Jones | 296/97.6 |
| 4,978,160 | 12/1990 | Wesschoff | 296/97.8 |

FOREIGN PATENT DOCUMENTS 8901280 4/1989 Fed. Rep. of Germany.
3814390 11/1989 Fed. Rep. of Germany.

Primary Examiner—Robert R. Song
Attorney, Agent, or Firm—Roylance, Abrams, Berdo & Goodman

[57] ABSTRACT

Of the type which takes the form of a laminar body generally of rectangular shape, opaque and fitted at the upper part of the vehicle's windscreen and hinged, it being characterized by having a hollow interior over most of its area in which is located a translucent supplementary filter which can eject at the lower part of the sun visor thus providing an additional surface of protection against the light rays and having also a means of internal retention which can be released manually so as to give effect to a rapid ejection of the said supplementary filter from the laminar opaque sun visor.

5 Claims, 3 Drawing Sheets

EXTENSIBLE SUN VISOR FOR MOTOR VEHICLE

BACKGROUND OF THE INVENTION

This invention refers to an extensible form of a motor vehicle sun visor having novel characteristics in its construction which provide a variable area of protection against the rays of the sun.

As it is known motor vehicle sun visors are fitted to avoid dazzling of the driver by the action of light rays which shine directly on to the eyes in the course of driving, such rays being solar rays in positions of the sun's low height over the horizon or from the lights of oncoming vehicles. Current types of sun visor generally consist of an opaque flat sheet, usually rectangular fixed to an arm in front of the driver and the front seat passenger such that when required the visor can be hinged downwards to prevent the dazzling by intercepting the light which otherwise would shine into the eyes of the vehicle occupants. The difficulty with existing visors is that they have to be limited in area so that they do not unduly obscure the field of vision while fulfilling their function in most cases and not presenting major obstructions to the view of the driver. However in some cases such as in a change in the grade of the road or when the sun is very low on the horizon or there is heavy on-coming traffic the current forms of sun visor fail to meet their objective, causing difficulties for the driver with the possibility in some cases of serious consequences due to the glare from the frontal light.

SUMMARY OF THE INVENTION

The object of this present invention is to obviate these difficulties by providing the driver with an effective protection against the frontal light rays at all times and with a simple means of operation. To this effect the sun visor, according to the present invention is of extensible form by having the laminar sheet designed to intercept the light rays capable of being extended quickly and easily when required while driving and able to be restored to its original size once the requirement no longer exists. This situation arises particularly when driving on an up-grade when additional protection is needed against the glare during a short period of time. Equally the requirement for an extensible sun visor, object of this patent, exists logically when the sun is low on the horizon such as at night-fall or dawn during the rising or setting of the sun. Heavy oncoming traffic also calls for such additional protection which this present invention is designed to offer.

Essentially the sun visor according to the present invention is characterized in that in the conventional opaque visor structure there is a supplementary sheet which can slide therein and is made in an obscure glass or methyl-acrilate and which acts as a filter of the offensive light rays causing the glare to the driver, this supplementary sheet being held completely within the conventional sun visor structure in its position of repose but ejected by a sliding motion from this structure to the exterior and thus providing the supplementary filter extending the lower edge of the visor during the time in which it is external to the structure. The nature of this supplementary component may be variable as long as it fulfils the requirements of translucency and possesses effective filtration characteristics to prevent dazzling of the driver by the oncoming or frontal light rays.

The lower edge of the extensibe sheet is protected with some form of soft or elastic material such as an elastomer or plastic material, this having a certain amount of give so as to avoid injury to the occupant in the case of abrupt movement or collision.

Retention of the supplementary sheet within the visor can be by various means so long as the retention means is capable of holding the sheet in its position of repose effectively and releasing it rapidly so that it can eject at the moment that it is required. For preference however the retention would be by means of a magnetic device with a release caused by manual operation of a push button this being both simple and reliable.

For ease of explanation drawings are attached hereto showing one non-limititive embodiment of the extensible sun visor in accordance with this patent.

DETAILED DESCRIPTION OF THE PREFERRED EMBODIMENT

Figure 1:
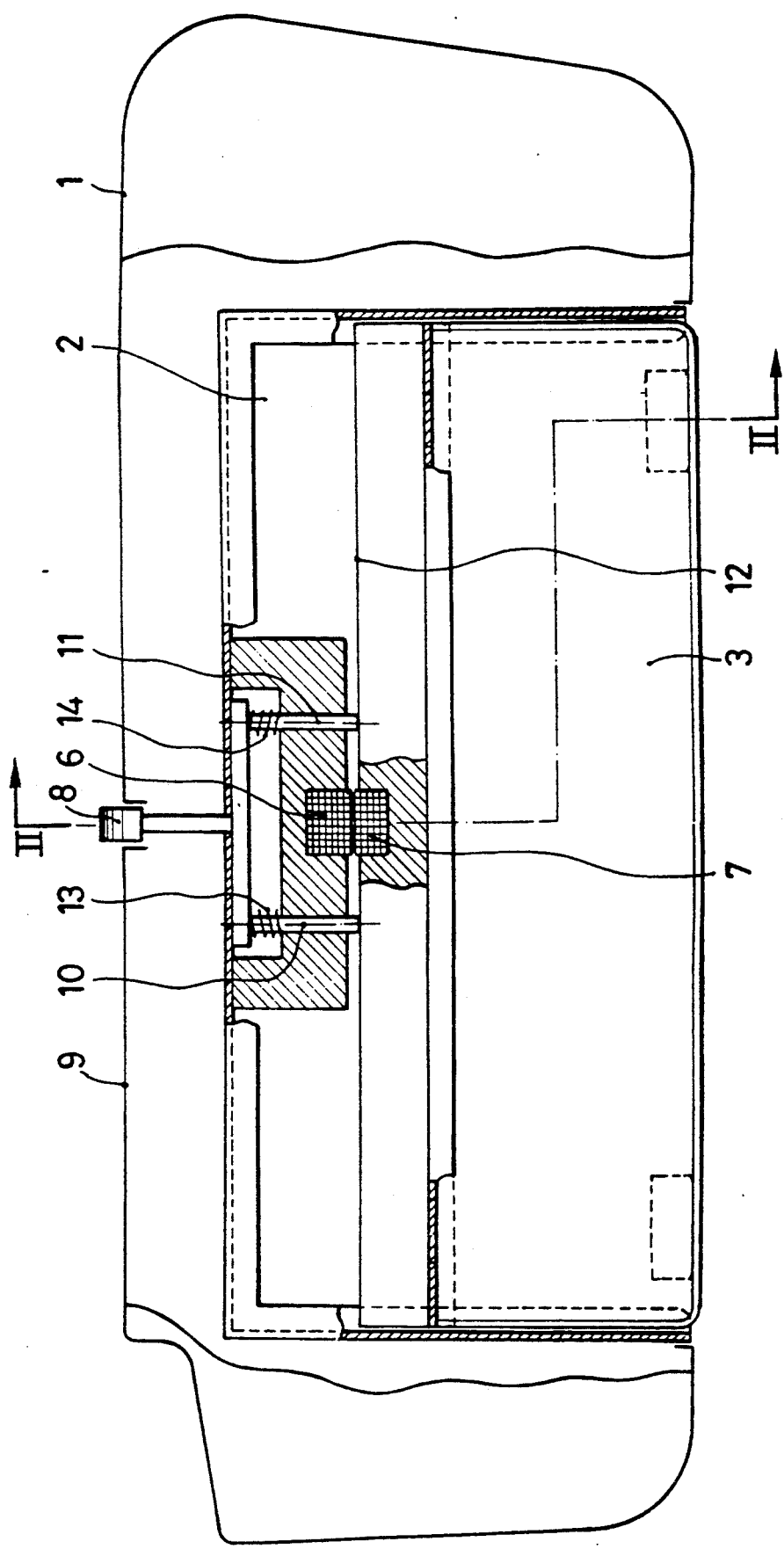
FIG. 1 is a front view of the extensible sun visor, in partial section showing its structure.
Figure 2:
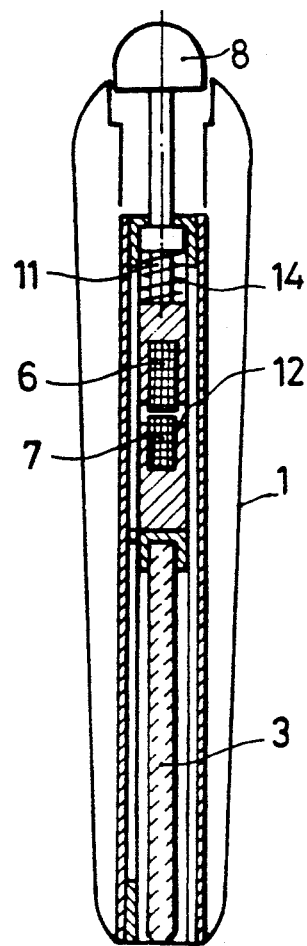
FIG. 2 corresponds to a section on the plane II—II in FIG. 1.
Figure 3:
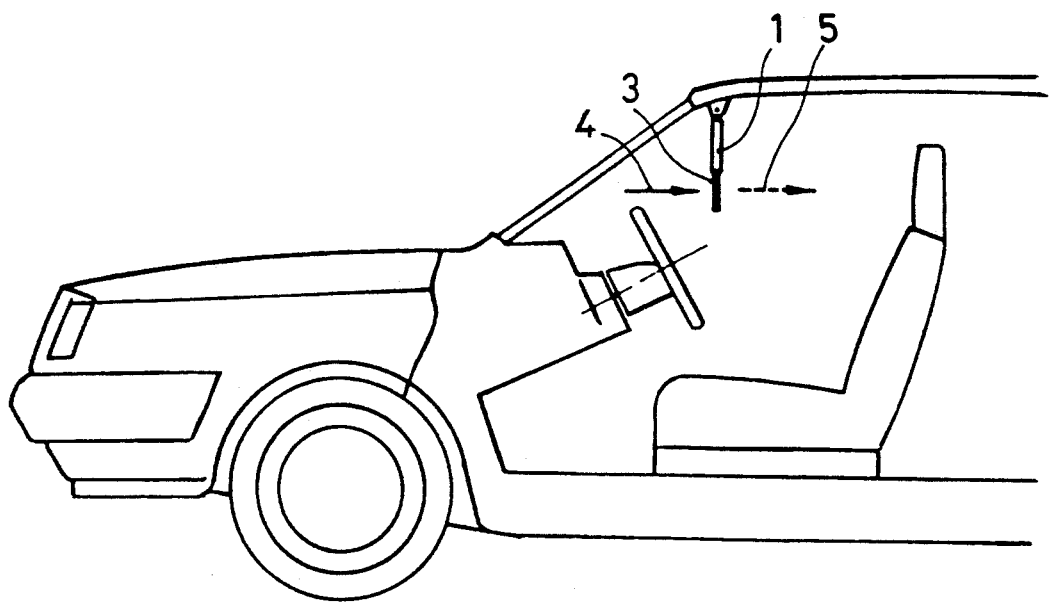
FIG. 3 shows shows in simplified form the arrangement of the sun visor in a motor vehicle.
Figure 4:
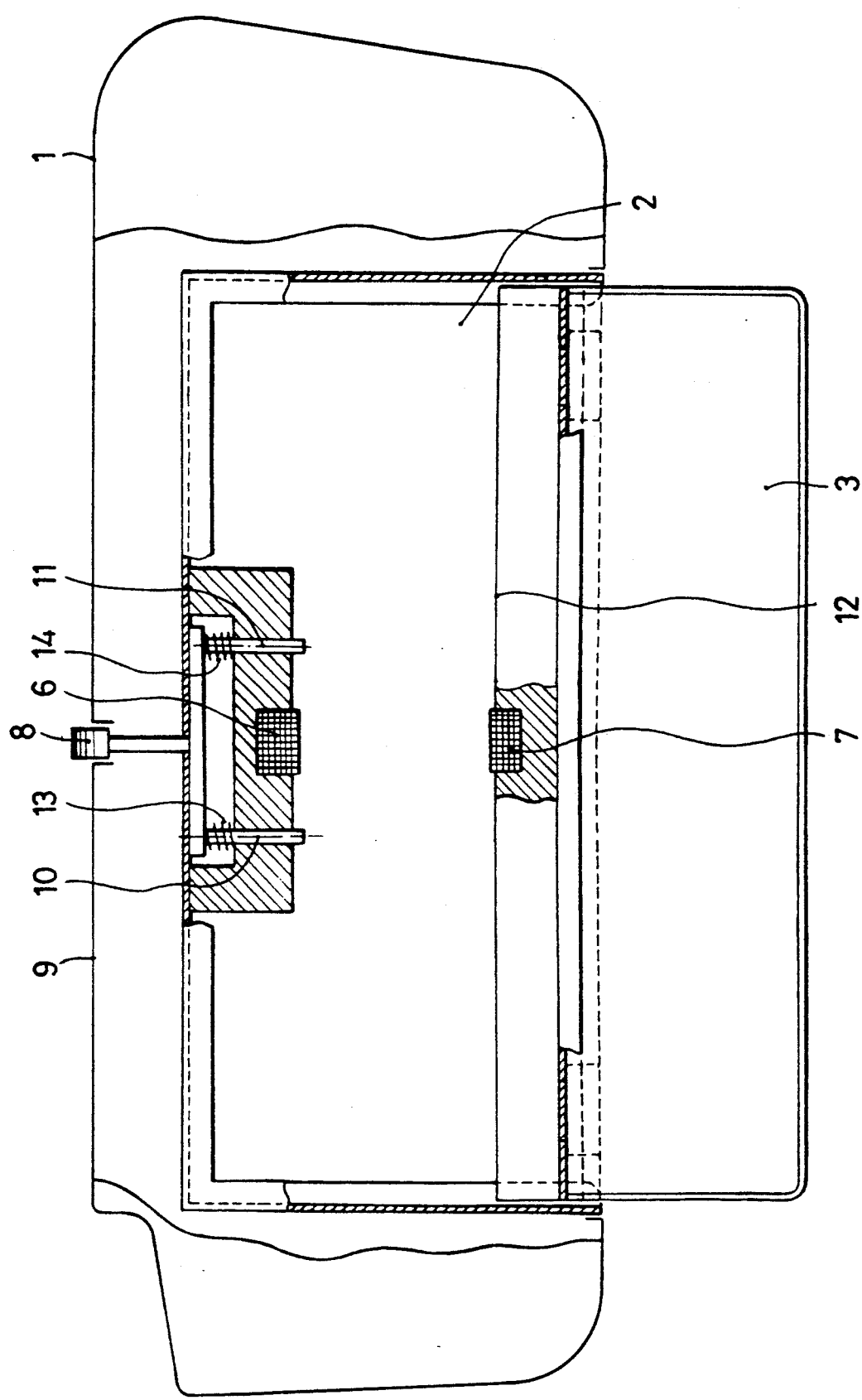
FIG. 4 shows the sun visor with its supplementary sheet ejected.

As may be seen in the drawings the sun visor, according to the present invention is characterized by having an opaque body 1 of a generally rectangular shape -1-, with an internal housing -2- designed to house a supplementary sheet or laminar board -3- (hereinafter also referred to as "supplement") of glass or methyl-acrillate or other material which is translucent and filtrant against the solar rays, and which in its position of repose is housed as shown in FIG. 1, that is fully within the opaque body -1- and hence presenting during this time solely the opaque surface, there being in the visor a retention system for the supplement -3- which can permit of its easy ejection from its housing -2- thus increasing the protective area of the visor as can be seen in FIG. 3, in which figure may be seen that the supplementary sheet -3- acts as a filter for the solar rays, allowing the passage only of the non aggressive rays -5- which are not detrimental to the vision of the driver. This achieves the additional protection against glare without impeding the correct vision of the driver.

The means for retaining the supplement within the housing can be variable on condition the means permit an effective retention which can be rapidly released by the driver at the required moment. However a preferred means consists of a magnetic system comprising magnets -6- and -7- attached respectively to the internal part of the housing -2- and to the supplement -3- such that in the situation shown in in FIG. 1, the supplement is held within the housing by the mutual action of the the magnets -6- and -7- and can be released by action of a push button -8- on the upper edge -9-. of the visor, operating through the pins -10- and -11- or some similar arrangement acting on the top -12- edge of the supplement -3-. Springs -13- and -14- act to restore the the original position of the button -8-. By this means the simple manual operation on the button -8- causes the supplementary sheet to eject from the panel -1- and provide the additional filtration of the frontal light rays This arrangement results in an easy additional protection against the light rays by means of a simple and rapid manual action thus avoiding glare or dazzle which arises from a grade change in the road or other causes of light incidents on the driver. In due time the sun visor is restored to its conventional position.

This invention pertains equally to the problem associated with the sun visor in front of the front seat passenger accompanying the driver and can take the form of a supplement -3- realized in the form of a mirror instead of being translucent.

Anything not altering, modifying or changing the essence of the visor as described is a variable for purposes of this invention.

I claim:

1. An extensible sun visor for a motor vehicle having a windscreen, comprising:

a generally rectangular laminar opaque body having an upper edge, a lower edge, and an interior cavity having a plurality of internal edges and an opening in the lower edge of the body;

hinge means for pivotally connecting the body to the motor vehicle above the windscreen;

a translucent light filtering supplementary piece slidably mounted in the cavity of the body and being movable in and out of the cavity through the opening; and means for retaining the supplementary piece inside the cavity, said retaining means including a pair of opposed magnetic pieces, one being fixed in one of the internal edges of the cavity and the other being fixed to an opposing edge of the supplementary piece, the pair of opposed magnetic pieces being magnetically coupled when the supplementary piece is fully retracted into the cavity of the body, and pins actuated from the upper edge of the body to separate the pair of opposed magnetic pieces, thus permitting the supplementary piece to fall by gravity force from the cavity.

2. an extensible sun visor for a motor vehicle having a windscreen, comprising:

a generally rectangular opaque body having an upper edge, a lower edge, and an interior cavity having a plurality of internal edges and an opening in the lower edge of the body;

hinge means for pivotally connecting the body to the motor vehicle above the windscreen;

a supplementary piece slidably mounted in the cavity of the body and being movable in and out of the cavity; and magnetic means for retaining the supplementary piece inside the cavity, wherein the magnetic retaining means comprises a pair of opposed magnetic pieces, one being fixed in one of the internal edges of the cavity and the other being fixed to an opposing edge of the supplementary piece, the pair of magnetic pieces being magnetically coupled when the supplementary piece is fully retracted into the cavity of the body.

3. An extensible sun visor according to claim 2, further comprising pins actuated from the upper edge of the body to separate the pair of opposed magnetic pieces.

4. An extensible sun visor according to claim 2, wherein the supplementary piece is made of a translucent light filtering material.

5. An extensible sun visor according to claim 2, wherein the supplementary piece is a mirror.

* * * * *